US010984221B2

(12) United States Patent
Saitou et al.

(10) Patent No.: US 10,984,221 B2
(45) Date of Patent: Apr. 20, 2021

(54) IMAGE RECOGNITION DEVICE

(71) Applicant: Panasonic Intellectual Property Management Co., Ltd., Osaka (JP)

(72) Inventors: Shigeru Saitou, Kyoto (JP); Shinzo Koyama, Osaka (JP); Masato Takemoto, Osaka (JP); Motonori Ishii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 67 days.

(21) Appl. No.: 16/494,742

(22) PCT Filed: Mar. 12, 2018

(86) PCT No.: PCT/JP2018/009377
§ 371 (c)(1),
(2) Date: Sep. 16, 2019

(87) PCT Pub. No.: WO2018/173819
PCT Pub. Date: Sep. 27, 2018

(65) Prior Publication Data
US 2020/0097702 A1 Mar. 26, 2020

(30) Foreign Application Priority Data
Mar. 22, 2017 (JP) .............................. JP2017-056350

(51) Int. Cl.
*G06K 9/00* (2006.01)
*G06T 7/586* (2017.01)
(Continued)

(52) U.S. Cl.
CPC ....... *G06K 9/00201* (2013.01); *G06K 9/6256* (2013.01); *G06N 3/08* (2013.01); *G06T 7/586* (2017.01)

(58) Field of Classification Search
CPC ............ G06K 9/00201; G06K 9/6256; G06K 9/6293; G06K 9/00369; G06K 9/00805;
(Continued)

(56) References Cited

U.S. PATENT DOCUMENTS 8,326,084 B1 * 12/2012 Marrion, Jr. ............ G06T 7/593
382/285
9,165,211 B2 * 10/2015 Rhee .................... G06K 9/4671
(Continued)

FOREIGN PATENT DOCUMENTS

JP  2013-168729 A   8/2013
JP  2016-218760 A  12/2016

OTHER PUBLICATIONS

International Search Report issued in corresponding International Patent Application No. PCT/JP2018/009377, dated Apr. 17, 2018, with English translation.
(Continued)

*Primary Examiner* — Michael S Osinski
(74) *Attorney, Agent, or Firm* — McDermott Will & Emery LLP

(57) ABSTRACT

An image recognition device includes: a luminance image generator and a distance image generator that generate a luminance image and a distance image, respectively, based on an image signal of an imaging target object output from a photoreceptor element; a target object recognition processor that extracts a target-object candidate from the luminance image using a machine learning database; and a three-dimensional object determination processor that uses the distance image to determine whether the extracted target-object candidate is a three-dimensional object. If it is determined that the target-object candidate is not a three-dimensional object, the target-object candidate extracted from the luminance image is prevented from being used, in
(Continued)

the machine learning database, as image data for extracting a feature value of a target object.

4 Claims, 5 Drawing Sheets

(51) Int. Cl.
*G06K 9/62* (2006.01)
*G06N 3/08* (2006.01)

(58) Field of Classification Search
CPC ........... G06K 9/00208; G06K 9/00791; G06K 9/4604; G06K 9/4661; G06K 9/00335; G06K 9/00355; G06K 9/00664; G06K 9/00671; G06K 9/00825; G06K 9/2027; G06K 9/52; G06K 9/6215; G06K 9/00221; G06K 9/00255; G06K 9/00288; G06T 7/586; G06T 7/521; G06T 7/73; G06T 7/11; G06T 7/194; G06T 7/50; G06T 7/248; G06T 7/285; G06T 2207/10028; G06T 2207/30244; G06T 2207/30261; G06N 3/08; H04N 13/239; H04N 13/271; H04N 13/296; H04N 5/2256; H04N 5/232; H04N 5/235; H04N 5/2351

See application file for complete search history.

(56) References Cited

U.S. PATENT DOCUMENTS

| | | | | |
|---|---|---|---|---|
| 9,171,372 | B2* | 10/2015 | Zhang | G06T 7/579 |
| 9,349,070 | B2* | 5/2016 | Kasaoki | G06K 9/4661 |
| 9,424,462 | B2* | 8/2016 | Otsuka | G08G 1/166 |
| 9,826,216 | B1* | 11/2017 | Hazeghi | G02B 27/30 |
| 10,057,498 | B1* | 8/2018 | Nunnink | H04N 5/2258 |
| 10,502,683 | B2* | 12/2019 | Lee | A61B 5/14546 |
| 10,510,149 | B2* | 12/2019 | Cutu | G06T 7/174 |
| 10,580,155 | B2* | 3/2020 | Sumiyoshi | H04N 13/239 |
| 2007/0177011 | A1* | 8/2007 | Lewin | B62D 15/0285 348/118 |
| 2009/0295937 | A1* | 12/2009 | Sato | H04N 5/235 348/222.1 |
| 2012/0195471 | A1* | 8/2012 | Newcombe | G06T 7/194 382/106 |
| 2013/0266174 | A1* | 10/2013 | Bleiweiss | G06K 9/00355 382/103 |
| 2014/0092221 | A1* | 4/2014 | Nagai | H04N 13/128 348/51 |
| 2014/0368656 | A1* | 12/2014 | Hayakawa | G06K 9/00798 348/148 |
| 2015/0116462 | A1* | 4/2015 | Makabe | H04N 13/204 348/47 |
| 2015/0292876 | A1* | 10/2015 | Pettersson | G01C 15/00 348/136 |
| 2015/0334269 | A1* | 11/2015 | Yokota | B60W 30/143 382/103 |
| 2016/0307032 | A1* | 10/2016 | Butler | G06K 9/00375 |
| 2016/0342855 | A1 | 11/2016 | Hattori et al. | |
| 2017/0017830 | A1* | 1/2017 | Hanai | G06K 9/52 |
| 2017/0098132 | A1* | 4/2017 | Yokota | G06K 9/00805 |
| 2017/0144585 | A1* | 5/2017 | Ogawa | G06K 9/6215 |
| 2017/0228606 | A1* | 8/2017 | Guan | G06T 7/90 |
| 2018/0018786 | A1* | 1/2018 | Jakubiak | G06T 7/11 |
| 2018/0114438 | A1* | 4/2018 | Rajagopalan | G08G 1/147 |
| 2018/0136332 | A1* | 5/2018 | Barfield, Jr. | G06T 7/70 |
| 2018/0211398 | A1* | 7/2018 | Schmidt | G01S 17/42 |
| 2018/0211399 | A1* | 7/2018 | Lee | G06T 7/536 |
| 2018/0345851 | A1* | 12/2018 | Lavoie | B62D 15/027 |
| 2018/0364731 | A1* | 12/2018 | Liu | G06T 7/74 |
| 2019/0073781 | A1* | 3/2019 | Izumi | G06T 7/521 |
| 2019/0138786 | A1* | 5/2019 | Trenholm | G06T 7/50 |
| 2019/0170506 | A1* | 6/2019 | Matsumoto | G01B 11/25 |
| 2019/0171161 | A1* | 6/2019 | Ulusoy | G03H 1/0841 |
| 2019/0253679 | A1* | 8/2019 | Tsubota | G06F 3/04166 |
| 2020/0089954 | A1* | 3/2020 | Zia | G06K 9/00671 |
| 2020/0184639 | A1* | 6/2020 | Park | G06T 7/11 |
| 2020/0259987 | A1* | 8/2020 | Van der Sijde | G06K 9/00201 |
| 2020/0389642 | A1* | 12/2020 | Xu | G06K 9/00221 |

OTHER PUBLICATIONS

G. Grant et al., "3D Vision Sensing for Improved Pedestrian Safety," 2004 IEEE Intelligent Vehicles Symposium University of Parma, Parma, Italy, Jun. 14-17, 2004, pp. 19-24.

M. Rapus et al., "Pedestrian Recognition Using Combined Low-Resolution Depth and Intensity Images," 2008 IEEE Intelligent Vehicles Symposium Eindhoven University of Technology Eindhoven, The Netherlands, Jun. 4-6, 2008, pp. 632-636.

Extended European Search Report issued in corresponding European Patent Application No. 18772141.0, dated Mar. 13, 2020.

* cited by examiner

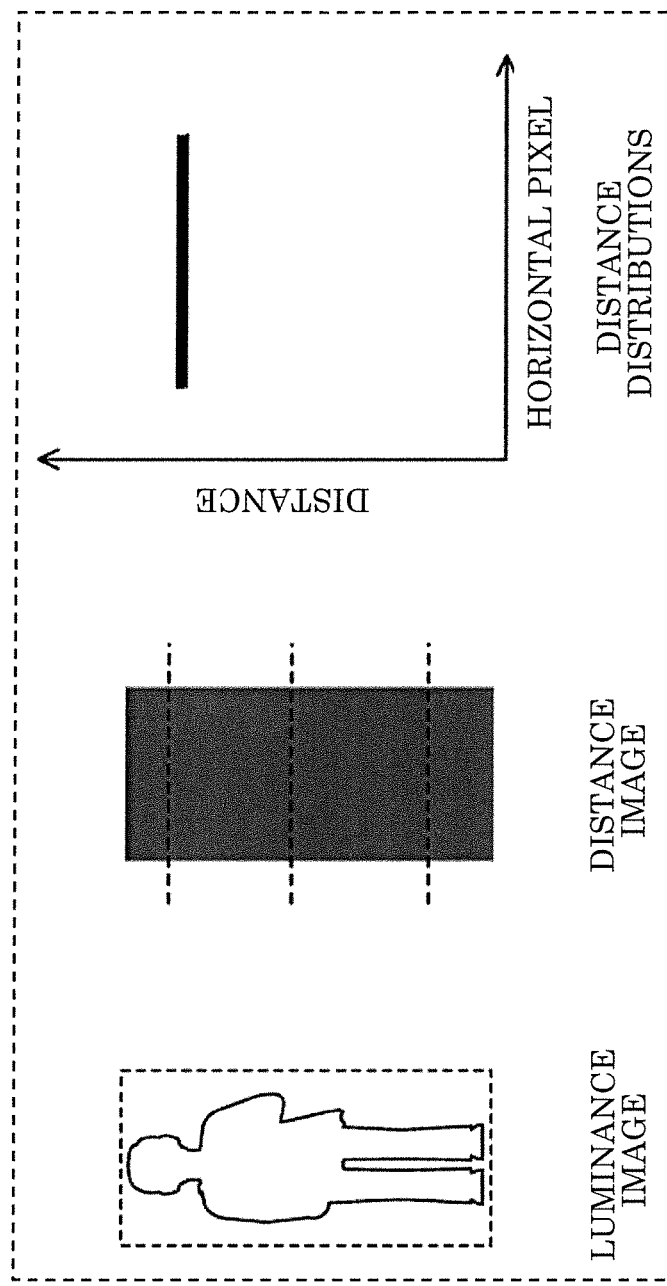

IMAGE RECOGNITION DEVICE

CROSS-REFERENCE OF RELATED APPLICATIONS

This application is the U.S. National Phase under 35 U.S.C. § 371 of International Patent Application No. PCT/JP2018/009377, filed on Mar. 12, 2018, which in turn claims the benefit of Japanese Application No. 2017-056350, filed on Mar. 22, 2017, the entire disclosures of which Applications are incorporated by reference herein.

TECHNICAL FIELD

The present disclosure relates to an image recognition device that may be used for an in-vehicle camera.

BACKGROUND ART

For determining the presence or absence of an obstacle in the path of a moving unit such as a vehicle, object detection systems using an imaging device such as a camera have been developed.

PTL 1 discloses an object detection technique in which a terminal device mounted on a vehicle provisionally detects a target-object candidate from an image captured by an in-vehicle camera and transmits only an image containing the candidate object to a server, which then investigates the received image to recognize the target object. According to this technique, objects in images can be accurately separated from the background of the images to efficiently collect images of a detected target object even if the brightness of images in a video varies. The data traffic between the terminal device and the server can also be reduced. PTL 1 also discloses using machine learning to recognize the target object.

In a technique disclosed in PTL 2, the outline of a target object is captured with a stereo camera, and multiple points on the detected target object are specified for measuring distances to the target object. The distances between the camera and the specified points are compared to determine whether the target object is a three-dimensional object, and if so, an image for a left eye and an image for a right eye are generated for stereoscopic display.

CITATION LIST

Patent Literature

PTL 1: Japanese Unexamined Patent Application Publication No. 2016-218760
PTL 2: Japanese Unexamined Patent Application Publication No. 2013-168729

SUMMARY OF THE INVENTION

Technical Problems

In machine-learning-based target object recognition, for example the one disclosed in PTL 1, the larger the data population accumulated in a database (hereinafter referred to as a DB) used for machine learning, the higher the accuracy of recognition because of an increased number of recognizers generated. On the other hand, the processing speed is reduced accordingly. Therefore, this technique may be disadvantageous in determining the presence or absence of an obstacle to a running vehicle in a short period of time.

In the configuration disclosed in PTL 2, the differences in distance vary with where the points are specified on the target object. The points may yield little difference in distance, depending on the positions of the points, and this may reduce the accuracy of determining whether the target object is a three-dimensional object.

The present disclosure has been made in view of the above circumstances, and an object thereof is to provide an image recognition device that extracts a target-object candidate for an object such as a human or vehicle from a captured image, and determines whether the extracted target-object candidate is an actual object such as a human or vehicle in a quick and reliable manner.

Solutions to Problems

In order to achieve the above-described object, in accordance with an aspect of the present disclosure, there is provided an image recognition device, including: a light source that emits modulated light temporally intensity-modulated; a photoreceptor element that receives reflected light from an imaging target object irradiated with the modulated light; a luminance image generator that generates a luminance image based on an image signal of the imaging target object, the image signal being output from the photoreceptor element; a distance image generator that generates a distance image based on the image signal of the imaging target object, the image signal being output from the photoreceptor element; a target object recognition processor that extracts a target-object candidate from the luminance image using a machine learning database storing image data for recognizing a feature value of a target object; and a three-dimensional object determination processor that determines, based on the distance image, whether the target-object candidate extracted by the target object recognition processor is a three-dimensional object, wherein, when the three-dimensional object determination processor determines that the target-object candidate is not a three-dimensional object, the target-object candidate extracted from the luminance image is prevented from being used, in the machine learning database, as image data for extracting a feature value of a target object.

According to the above configuration, using both the luminance image and the distance image enables reliable determination of whether the extracted target-object candidate is an actual target object or is a picture or photograph appearing on, e.g., a poster. The result of determining whether the target-object candidate is a three-dimensional object is reflected in the machine learning database, so that the accuracy of target object recognition can be improved.

It is possible that the three-dimensional object determination processor calculates, for pixels in a plurality of lines in the distance image of the target-object candidate, distances between the target-object candidate extracted by the target object recognition processor and the photoreceptor element, calculates an average and a dispersion of the distances for each of the plurality of lines, and determines whether the target-object candidate is a three-dimensional object, based on a proportion of pixels whose deviation from the average is a predetermined value or more with respect to the dispersion to all pixels in the line.

It is also possible that the three-dimensional object determination processor determines that the target-object candidate is a three-dimensional object when pixels whose deviation from the average is two times or more than the dispersion constitute 10% or more of all pixels in the line.

It is further possible that the modulated light emitted from the light source has a wavelength in a range from 800 nm to 1100 nm, inclusive.

According to the above configuration, the luminance image and the distance image of the target object can be acquired without affecting human vision.

Advantageous Effects of Invention

With an image recognition device according to the present disclosure, a target-object candidate can be extracted from a captured image to reliably determine whether the extracted target-object candidate is an actual target object. The result of determining whether the target-object candidate is a three-dimensional object can be reflected in a machine learning database to improve the accuracy of target object recognition.

BRIEF DESCRIPTION OF DRAWINGS

FIG. 3B illustrates another exemplary result of three-dimensional object recognition through distance image analysis.

DESCRIPTION OF EXEMPLARY EMBODIMENT

Figure 1:
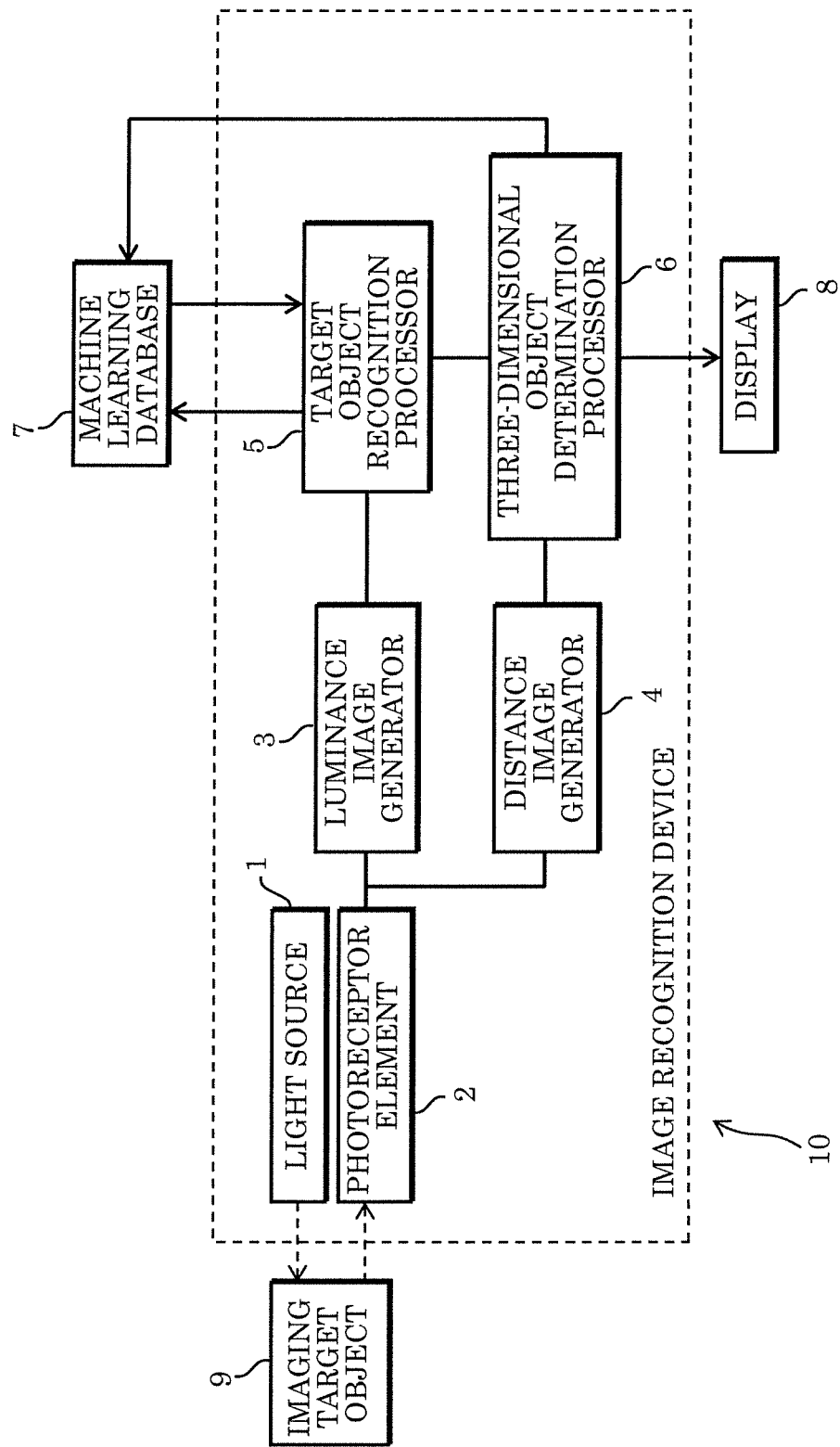
FIG. 1 is a block diagram illustrating an exemplary configuration of an image recognition device and its periphery according to an embodiment.

Hereinafter, certain exemplary embodiments are described in greater detail with reference to the accompanying Drawings. It should be noted that all the embodiments described below are preferable examples of the present disclosure. Numerical values, shapes, materials, constituent elements, arrangement positions and the connection configuration of the constituent elements, and the like described in the following embodiments are merely examples, and are not intended to limit the present disclosure. The present disclosure is characterized by the appended claims. Therefore, among the constituent elements in the following embodiments, constituent elements that are not described in independent claims that show the most generic concept of the present disclosure are described as elements constituting more desirable configurations. Furthermore, each figure in the Drawings is a schematic diagram and is not necessarily an exact diagram.

Figure 2:
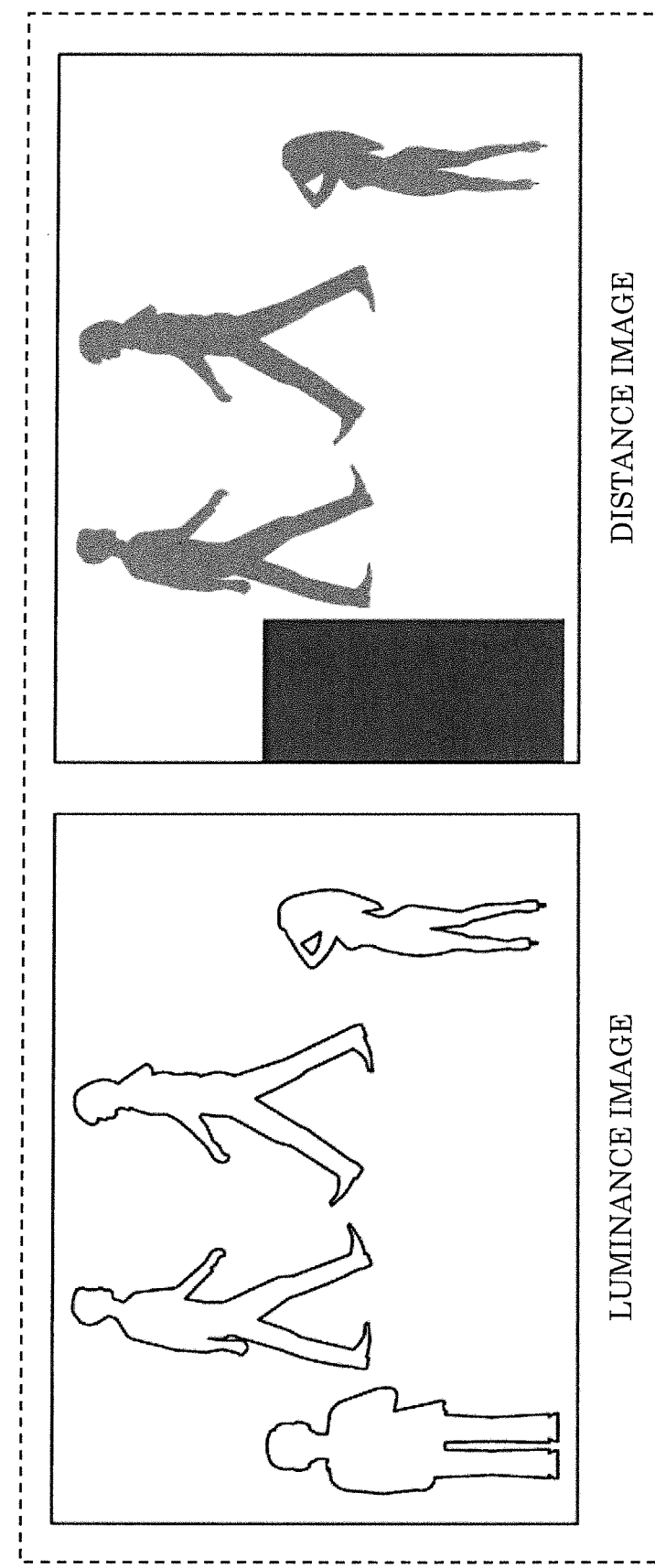
FIG. 2 illustrates an exemplary result of human candidate extraction through luminance image analysis.
Figure 3A:
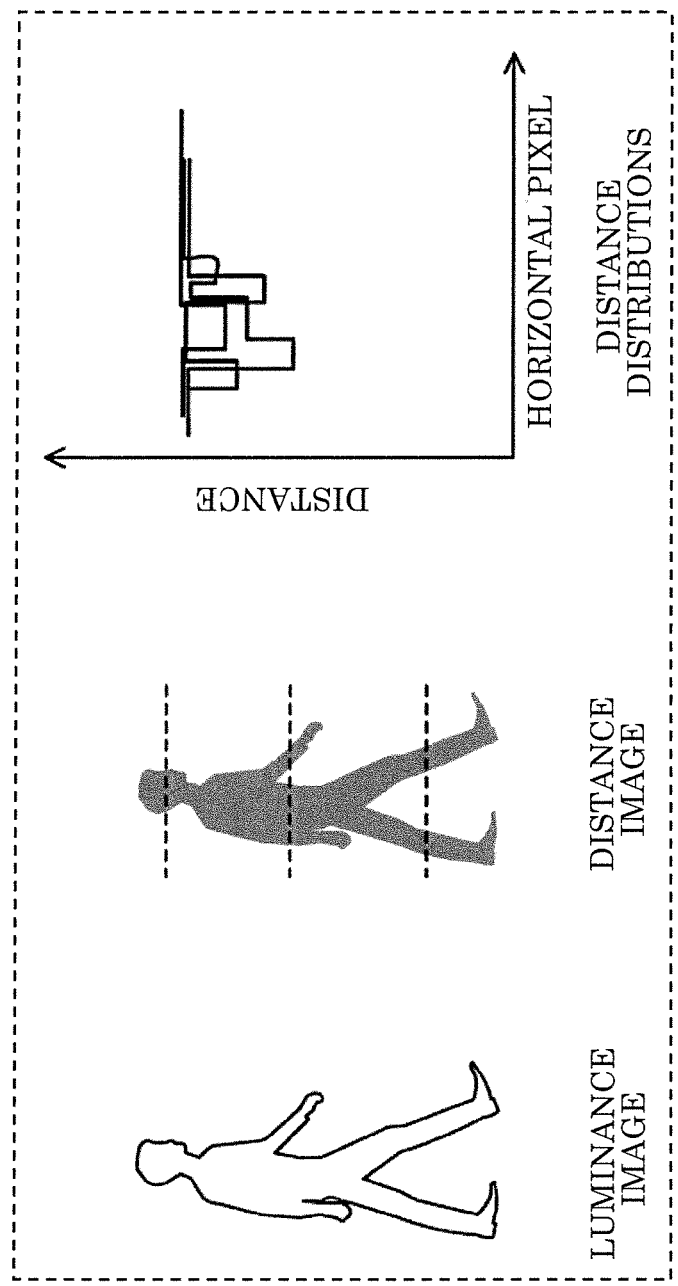
FIG. 3A illustrates an exemplary result of three-dimensional object recognition through distance image analysis.

FIG. 1 is a block diagram illustrating an exemplary configuration of image recognition device 10 and its periphery according to an embodiment. FIG. 2 illustrates an exemplary result of human candidate extraction through luminance image analysis. FIGS. 3A and 3B illustrate an exemplary result of three-dimensional object recognition through distance image analysis according to the embodiment. For convenience of illustration, luminance images in FIG. 2 and FIGS. 3A and 3B show only the outlines of human candidates.

Image recognition device 10 in FIG. 1 includes light source 1, photoreceptor element 2, luminance image generator 3, and distance image generator 4. FIG. 1 also shows machine learning database 7, display 8, and imaging target object 9 on the periphery of image recognition device 10.

Light source 1 includes a laser or an LED that uses near-infrared light with a wavelength in the range from 800 nm to 1100 nm. The light in this wavelength band is used because it allows acquiring a luminance image and a distance image of imaging target object 9 without affecting human vision. Further, the light emitted from light source 1 is temporally intensity-modulated. The pulse width of the light emitted from light source 1 is controllable in the range from several nanoseconds to several hundreds of nanoseconds, depending on factors such as the required measured distance range, distance accuracy, and frame rate.

Photoreceptor element 2 includes a photoelectric converter having two-dimensionally arranged pixels, each including a photodiode mainly made of an Si-based material. Photoreceptor element 2 is a semiconductor element integrating the photoelectric converter and a circuit that transfers or processes signals from the above-described pixels.

The light emitted from light source 1 is reflected on imaging target object 9, and the reflected light passes through an imaging lens to form an image on the photoreceptive surface of photoreceptor element 2. Photoreceptor element 2 can thus obtain optical information from imaging target object 9.

Image recognition device 10 includes target object recognition processor 5 that determines whether imaging target object 9 captured is a target-object candidate on the basis of a luminance image acquired by luminance image generator 3 and extracts an image of imaging target object 9 determined to be a target-object candidate. Image recognition device 10 includes three-dimensional object determination processor 6 that determines whether imaging target object 9 extracted is a three-dimensional object on the basis of a distance image acquired by distance image generator 4.

Luminance image generator 3 generates a luminance image from the intensities of photoreceptive signals of the light reflected on imaging target object 9 and received by photoreceptor element 2. From the luminance image, the contrast of the captured object can be obtained. The data of this luminance image is transferred to target object recognition processor 5, which determines whether imaging target object 9 is a target-object candidate.

Distance image generator 4 generates a distance image based on the arrival time of each of the photoreceptive signals of the light reflected on imaging target object 9 and received by photoreceptor element 2. Specifically, the time is measured from the emission of the light from light source 1 to the arrival of the light reflected on imaging target object 9 at photoreceptor element 2. Dividing the measured time by the speed of the light can provide the distance from photoreceptor element 2 to imaging target object 9. This is a known method called Time-of-Flight (TOF). The measured distance can be plotted on a two-dimensional plane for each pixel of photoreceptor element 2 to acquire the distance image.

Using the luminance image generated by luminance image generator 3, target object recognition processor 5 determines whether captured imaging target object 9 is a target-object candidate and, if so, extracts the target-object candidate. For example, the target-object candidate is extracted as image data about the portion of the luminance image corresponding to the target-object candidate. Because the target object is assumed to be a human in this embodiment, the following description illustrates recognizing a human candidate. Whether the target-object candidate is a human candidate may be determined by extracting feature values from the luminance image of imaging target object 9 with various techniques, and may be based mainly on whether the outline of imaging target object 9 corresponds to a human. Increasing the accuracy of this determination requires accumulating thousands to tens of thousands of pieces of image data in machine learning DB 7 and further using this image data to generate, with machine learning, a recognizer capable of recognizing a human candidate. While various techniques have been proposed for the feature value calculation and the recognizer generation (for example, HOG (Histograms of Oriented Gradients) feature values and SVM (Support Vector Machine) recognizers), any technique may be used here. As shown in FIG. 2, the outlines of human candidates extracted by target object recognition processor 5 and the positions of the human candidates in the imaging area may be displayed on, e.g., display 8 for review.

Three-dimensional object determination processor 6 determines whether the human candidate extracted by target object recognition processor 5 is a three-dimensional object. It may sometimes not be possible to determine whether the human candidate extracted by target object recognition processor 5 is an actual human or a seemingly human picture on a poster or sign. For example, in FIG. 2, an image (an image in the lower-left corner) extracted as a human candidate from the luminance image on the left presents a uniform plate-like outline in the distance image on the right. This suggests that the extracted image is not an image of an actual human but an image of a planar object such as a poster or sign. For example, if an image recognition device with an in-vehicle camera mounted on a moving unit recognizes a human only on the basis of a luminance image, a poster or sign might be erroneously recognized as a human, leading to an accident due to hard braking or sudden steering-wheel operation.

In order to prevent such erroneous recognition, image recognition device 10 according to this embodiment causes three-dimensional object determination processor 6 to determine whether the human candidate extracted from the luminance image is a three-dimensional object; if so, the human candidate is recognized as an actual human. The recognition result may be displayed on display 8 for review.

Machine learning DB 7 stores thousands to tens of thousands of pieces of image data. In this embodiment, the image data is read and used by target object recognition processor 5 for purposes such as generating a recognizer for recognizing, e.g., human feature values.

Display 8 may be, for example, a liquid crystal display or an organic EL display, and may display the luminance image and the distance image or the result of processing these images.

Three-dimensional object determination processor 6 horizontally scans along multiple lines in the distance image acquired by distance image generator 4 and compares the distances. Here, the image is scanned along the lines spaced a predetermined interval apart from one another. As shown in FIG. 3A, if the distance image includes a three-dimensional object, the distance distributions on the lines do not coincide. By contrast, as shown in FIG. 3B, if the distance image results from capturing a planar object such as wallpaper, the distance distributions on the lines coincide.

Whether imaging target object 9 is a three-dimensional object is determined by calculating the average and the dispersion of the distances measured for each line to see the proportion of pixels whose deviation from the average is a predetermined value or more with respect to the dispersion to all pixels in the line. In this embodiment, the average and the dispersion of the measured distances for each scanned line are calculated, and, if pixels whose deviation from the average is two times or more greater than the dispersion constitute 10% or more of all pixels in the line, imaging target object 9 is determined to be a three-dimensional object. It is to be noted that the criterion for determining whether imaging target object 9 is a three-dimensional object is not limited to the above. For example, the criterion may be changed as appropriate according to factors such as the intervals between the scanned lines, the number of pixels per line, and whether imaging target object 9 is captured with the light source provided in the moving unit and with the photoreceptor element. The result of the determination by three-dimensional object determination processor 6 can be reflected in machine learning DB 7 to further improve the accuracy of determining whether a captured image includes a human. While FIGS. 3A and 3B illustrate calculating the distance for each point by horizontally scanning the distance image, this is not limiting. For example, the distance may be calculated by vertically scanning the distance image.

Figure 4:
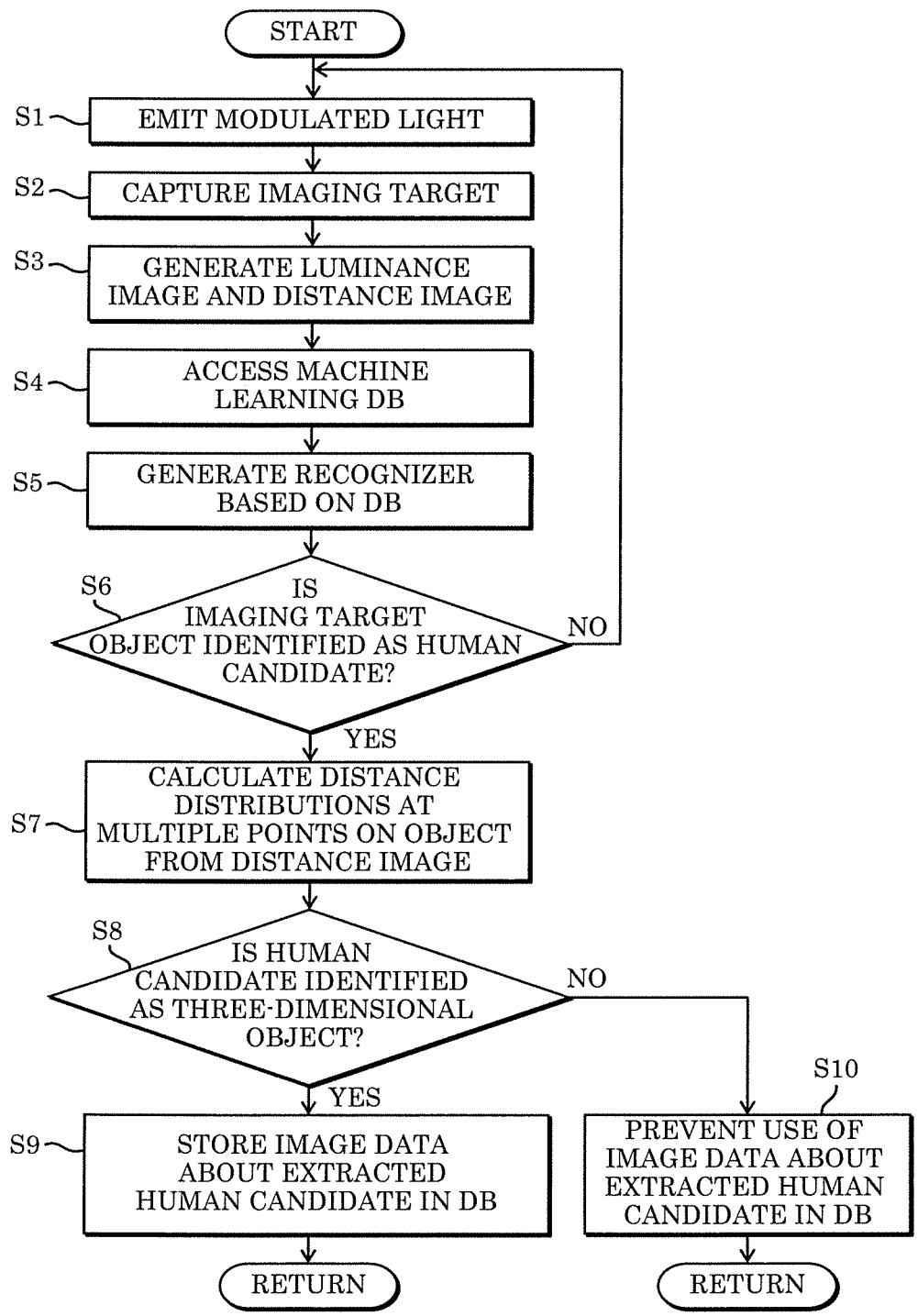
FIG. 4 is an exemplary flowchart illustrating a method of recognizing a human using the image recognition device according to the embodiment.

FIG. 4 is an exemplary flowchart illustrating a method of recognizing a human using the image recognition device according to the embodiment.

First, imaging target object 9 is irradiated with intensity-modulated light from light source 1 (step S1). The light reflected from imaging target object 9 is received by photoreceptor element 2 to capture imaging target object 9 (step S2). An image signal of imaging target object 9 output by photoreceptor element 2 is sent to luminance image generator 3 and distance image generator 4, which generate a luminance image and a distance image of imaging target object 9, respectively (step S3).

The generated luminance image is sent from luminance image generator 3 to target object recognition processor 5. Target object recognition processor 5 further accesses machine learning DB 7 (step S4). On the basis of image data accumulated in machine learning DB 7, feature values for determining whether the object is a human are extracted, and a recognizer is generated in target object recognition processor 5 (step S5). The feature values and the recognizer are used to determine whether imaging target object 9 is a human candidate (step S6).

If imaging target object 9 is a human candidate, three-dimensional object determination processor 6 horizontally or vertically scans along multiple lines of pixels in the corresponding distance image to calculate distance distributions for the multiple measurement points (step S7). On the basis of the distance distributions, three-dimensional object determination processor 6 determines whether the extracted human candidate is a three-dimensional object (step S8). This determination is made in such a manner as described with reference to FIGS. 3A and 3B. If the extracted human candidate is a three-dimensional object, the human candidate is regarded as an actual human; as such, for example, an image of imaging target object 9 is saved in machine learning DB 7 (step S9). The process then returns to continue capturing.

If it is determined at step S6 that imaging target object 9 is not a human candidate, the process returns to continue capturing. If it is determined at step S7 that the human candidate is not a three-dimensional object, the use of the image data extracted as the human candidate is prevented in machine learning DB 7 (step S10). The process then returns to continue capturing. Exemplary ways to prevent the use of the image data include the following: the image data extracted as the human candidate is not saved in machine learning DB 7; or the image data may be saved in machine learning DB 7 but is not used for generating a recognizer for recognizing human feature values.

Thus, according to this embodiment, a target object is irradiated with temporally intensity-modulated light, and the reflected light is captured to generate a luminance image and a distance image. This allows obtaining the outline and contrast of imaging target object 9, and distances from imaging target object 9 to the light source. Machine learning DB 7 is used to extract a target-object candidate such as a human candidate from the luminance image. The distance image is used to determine whether the extracted target-object candidate is a three-dimensional object. In this manner, whether imaging target object 9 captured is an actual target object can be determined.

If the extracted target-object candidate such as a human candidate is not a three-dimensional object, image data extracted as the target-object candidate is prevented from being used as data for extracting, e.g., feature values of a target object. This can improve the speed of determining whether imaging target object 9 is an actual target object. For example, if signs of the same type depicting a target object are placed along a road driven by a vehicle, image data about the target object on the signs is prevented from being used for target object recognition; this leads to improved accuracy and speed of target object recognition. Thus, erroneous target object recognition can be prevented.

While this embodiment has illustrated the example of determining whether imaging target object 9 is a human, it is also possible to determine whether imaging target object 9 is a vehicle, a human in a vehicle, or a specific kind of animal. It is to be understood that the image data in machine learning DB 7 used in such a case may be image data about vehicles, humans in vehicles, or the specific kind of animals, respectively. Machine learning DB 7 and/or display 8 may be integrated into image recognition device 10.

Although the image recognition device according to the present disclosure has been described with reference to the embodiments as above, the present disclosure is not limited to these embodiments. Variations including various modifications made to the embodiments by those skilled in the art or other embodiments with any combinations of a part of the constituent elements according to the embodiments and variations are also within the present disclosure if they do not depart from the scope of the present disclosure.

INDUSTRIAL APPLICABILITY

An image recognition device according to the present disclosure can prevent erroneous recognition of a target object such as a human, and is useful for, e.g., image recognition cameras serving as in-vehicle cameras. The image recognition device is also applicable to uses such as monitoring and security.

The invention claimed is:
1. An image recognition device, comprising:
a light source that emits modulated light which is temporally intensity-modulated;
a photoreceptor element that receives reflected light from an imaging target object irradiated with the modulated light;
a luminance image generator that generates a luminance image based on an image signal of the imaging target object, the image signal being output from the photoreceptor element;
a distance image generator that generates a distance image based on the image signal of the imaging target object, the image signal being output from the photoreceptor element;
a target object recognition processor that extracts a target-object candidate from the luminance image using a machine learning database storing image data for recognizing a feature value of a target object; and
a three-dimensional object determination processor that determines, based on the distance image, whether the target-object candidate extracted by the target object recognition processor is a three-dimensional object,
wherein, when the three-dimensional object determination processor determines that the target-object candidate is not a three-dimensional object, the target-object candidate extracted from the luminance image is prevented from being used, in the machine learning database, as image data for extracting a feature value of a target object.
2. The image recognition device according to claim 1,
wherein the three-dimensional object determination processor
calculates, for pixels in a plurality of lines in the distance image of the target-object candidate, distances between the target-object candidate extracted by the target object recognition processor and the photoreceptor element,
calculates an average and a dispersion of the distances for each of the plurality of lines, and
determines whether the target-object candidate is a three-dimensional object, based on a proportion of pixels whose deviation from the average is a predetermined value or more with respect to the dispersion to all pixels in the line.
3. The image recognition device according to claim 2,
wherein the three-dimensional object determination processor determines that the target-object candidate is a three-dimensional object when pixels whose deviation from the average is two times or more than the dispersion constitute 10% or more of all pixels in the line.
4. The image recognition device according to claim 1,
wherein the modulated light emitted from the light source has a wavelength in a range from 800 nm to 1100 nm, inclusive.

* * * * *